US007005490B2

(12) United States Patent
Mestach et al.

(10) Patent No.: US 7,005,490 B2
(45) Date of Patent: Feb. 28, 2006

(54) METHOD FOR MAKING METHACRYLATE UNIT-CONTAINING LOW-POLYDISPERSITY POLYMERS

(75) Inventors: Dirk Emiel Paula Mestach, Nijlen (BE); Richard Hendrikus Gerrit Brinkhuis, Zwolle (NL); Petrus Johannes Maria David Elfrink, Boxmeer (NL)

(73) Assignee: Nuplex Resins, B.V., Bergen Op Zoom (NL)

( * ) Notice: Subject to any disclaimer, the term of this patent is extended or adjusted under 35 U.S.C. 154(b) by 0 days.

(21) Appl. No.: 10/620,939

(22) Filed: Jul. 15, 2003

(65) Prior Publication Data

US 2004/0106759 A1 Jun. 3, 2004

(30) Foreign Application Priority Data

Jul. 23, 2002 (EP) .................................. 02078523

(51) Int. Cl.
*C08F 4/46* (2006.01)
(52) U.S. Cl. ...................... 526/181; 526/182; 526/222; 526/225; 526/319
(58) Field of Classification Search ................ 526/181, 526/182, 222, 225, 319
See application file for complete search history.

(56) References Cited

U.S. PATENT DOCUMENTS

| 4,055,713 | A | * | 10/1977 | Moczygemba et al. | ...... 526/207 |
| 5,359,018 | A | | 10/1994 | Yeh | ............................ 526/221 |
| 5,439,980 | A | * | 8/1995 | Yutani et al. | ............... 525/276 |
| 6,132,918 | A | * | 10/2000 | Enright et al. | .......... 430/111.35 |
| 6,143,848 | A | | 11/2000 | Lee et al. | ................... 526/212 |

OTHER PUBLICATIONS

European Search Report Application No. EP 02 07 8004 dated Oct. 10, 2002.
Matyjaszewski, et al., "Living' and Controlled Radical Polymerization," Journal of Physical Organic Chemistry, vol. 8, No. 4 (1995) p.p. 306-315.
Gaynor, et al., "Controlled Radical Polymerization by Degenerative Transfer : Effect of the Structure of the Transfer Agent," Macromolecules 1995, vol. 28, No. 24, p.p. 8051-8056.
Butté et al., "Miniemulsion Living Free Radical Polymerization of Styrene," Macromolecules 2000, vol. 33, No. 9, p.p. 3485-3487.
Lansalot, et al., "Controlled Free-Radical Miniemulsion Polymerization of Styrene Using Degenerative Transfer," Macromolecules 1999, vol. 32, No. 22, p.p. 7354-7360.
Goto, et al., "Mechanism and Kinetics of Iodide-Mediated Polymerization of Styrene," Macromolecules 1998, vol. 31, No. 9, p.p. 2809-2814.
Matyjaszewski, et al., "Controlled Radical Polymerizations: The Use of Alkyl Iodides in Degenerative Transfer," Macromolecules 1995, vol. 28, No. 6, p.p. 2093-2095.
Farcet, et al., "Polystyrene-*block*-poly(butyl acrylate) and polystyrene-*block*-poly[butyl acrylate)-co-styrene] block copolymers prepared via controlled free-radical miniemulsion polymerization using degenerative iodine transfer," Macromol. Rapid Commun. 2000, vol. 21, No. 13, p.p. 921-926.
Website document for Klumperman, B. at the UNESCO School & South African IUPAC conference on Macromolecular and Materials Science, Mar. 29-31, 1999.
Website document for Klumperman, B. at the UNESCO School & South African IUPAC conference on Macromolecular and Materials Science, Apr. 10-12, 2000.
Lissi et al., "Methyl Methactylate Polymerization in the Presence of Iodine," J. Polym Sci., Polymer Letters Edition, vol. 14, No. 8 (1976), p.p. 499-502.
Derwent Abstract No. 1976:494752 abstracting Lissi et al., J. Polym. Sci., Polym. Lett. Ed. (1976), 14(8), p.p. 499-502.
Ghosh et al., "Chain Transfer in Presence of Halogens in the Polymerization of Methylmethacrylate," J. Polym. Sci., Polymer Letters Edition, vol. 13, No. 1 (1975), p.p. 35-38.
Derwent Abstract No. 1975:125644 abstracting Ghosh et al., J. Polym. Sci., Polym. Lett. Ed. (1975), 13(1), p.p. 35-38.
Stolzenbach, H., "Cross-Linking of Binding Agents for Paints," Advances in Organics Coatings Science and Technology Series (1989), vol. 11, p.p. 246-259.
Ooka, M., "Recent Developments in Crosslinking Technology for Coating Resins," DIC Tech. Rev. (1995), No. 1, p.p. 1-8.
Geurts et al., "Syntheses of New Amino-Functionalized Methacrylates and Their Use in Free Radical Polymerizations," Journ. Of Applied Polm. Sci. 2001, vol. 80, No. 9, p.p. 1401-1415.
Wicks et al., "Blocked isocyanates III : Part A. Mechanisms and chemistry," Prog. Org. Coat. 36 (1999), p.p. 148-172.

* cited by examiner

*Primary Examiner*—Bernard Lipman
(74) *Attorney, Agent, or Firm*—Howrey LLP

(57) ABSTRACT

The invention pertains to a method for making a methacrylate unit-containing polymer with polydispersity <1.7 and containing at least one cross-linkable functional group comprising a step of radically polymerizing a mixture of ethylenically unsaturated monomers comprising at least 50 mole % of methacrylate monomers to a polymer, in the presence of a) a radical precursor and b) $I_2$ or a sulfonyl iodide.

16 Claims, No Drawings

METHOD FOR MAKING METHACRYLATE UNIT-CONTAINING LOW-POLYDISPERSITY POLYMERS

The invention pertains to a method for making a methacrylate unit-containing polymer with a polydispersity <1.7 and containing at least one cross-linkable functional group.

Polymers with a lower polydispersity and a narrow molar mass distribution have benefits for cross-linkable compositions containing monomers with functional side groups, in that a narrower molar mass distribution will lead to narrower functionality distributions. Broad functionality distributions are detrimental when polymers are used in applications such as film forming or in cross-linking compositions such as coatings formulations, especially if polymers with rather low-molecular weights (and functionalities) are used, as e.g. in so-called high solids coatings, wherein these polymers are cross-linked. The high-molecular weight, high functionality side of the molecular weight distribution raises the viscosity and limits the "pot life" of so-called two-component formulations, whereas the low-molecular weight, low functionality side may contribute to the formation of so-called dead-ends and extractable materials, which limit the properties of the cross-linked films to be formed.

Narrow-polydispersity functional polymers have been prepared and described for so-called "living" (or "controlled") radical polymerizations.

In the field of "living" radical polymerizations (polymerizations under radical conditions where termination processes of growing radicals are reversible, so that all initiated chains can, in principle, continue to grow as long as monomers and radicals are present), three technologies have been studied in depth:

nitroxide mediated polymerizations (NMP), which are based on homolytic scission of the covalent bond formed between a polymer radical and a nitroxide stable radical;

atom transfer radical polymerization (ATRP), in which a halogen (usually Cl or Br) atom is reversibly transferred between a Cu(I/II) complex and a polymer radical, in a process that encompasses a redox cycle;

reversible addition fragmentation chain transfer (RAFT), which is a process wherein dithioester end groups can be rapidly and reversibly transferred between polymeric radicals.

For all these systems, the living character was proven by a typically linear development of molecular weight with conversion, low polydispersities obtained in polymerizations, and the preparation of block copolymers by sequential addition of different monomers.

Especially ATRP and RAFT have possibilities for numerous applications with respect to the types of monomers used. In ATRP, however, acidic conditions and acidic monomers create problems, while the necessary removal of the Cu-amine complexes from the polymers is an expensive and thus unwanted step. In RAFT, these limitations do not occur, but this method suffers in that the polymer chains formed contain dithioester end groups, which are strong chromophores. The chromophores can be destroyed by reaction with a nucleophile, but this nucleophile is not always compatible with the functional groups that may be present in the chains. Such chromophore destruction comes at the expense of an extra reaction step and leads to low-molecular weight products in the polymer, which may be difficult to remove. Moreover, the dithioester mediating compounds are expensive.

In general, RAFT has been assumed to be favourable in the rate of end group transfer (more transfer events, lower polydispersibility, better control). A lower polydispersibility is desirable when the polymer is used in e.g. film-forming or cross-linking compositions. A narrow molecular weight distribution in such applications leads to a good balance of pot life and curing speed, viscosity and network properties. Further, in the art it is assumed that the RAFT process is applicable to a broad range of monomers.

NMP has the disadvantage that expensive nitroxides are needed if the process is to be used at acceptably low temperatures for acrylates, whereas methacrylates have intrinsic problems due to the fact that disproportionation may occur as a side reaction.

Another type of living radical polymerization process is degenerative iodine transfer (DIT) (see for instance, *Journal of Physical Organic Chemistry*, Vol. 8, 306–315 (1995) and *Macromolecules*, 28, 8051–8056 (1995)). In this process, as in the RAFT process, an iodine end group can transfer from one polymer to a radical end group of another polymer present in the polymerization system, the iodine atom playing a similar role to that of the dithioester group in RAFT. A chain transfer agent with an iodine atom is used as entry in the DIT process. Conventional iodine chain transfer agents include alkyl or perfluoroalkyl iodides.

In *Macromolecules*, 28, 8051–8056 (1995); *Macromolecules*, 33(9), 3485 (2000); *Macromolecules*, 32(22), 7354 (1999); *Macromolecules*, 31(9), 2809 (1998) the DIT process was described for application with styrene monomers, for which it appears to work moderately well (polydispersities typically about 1.5), and for application with halogenated vinyl monomers like vinyl chloride and fluorinated vinyl species.

DIT was attempted for acrylates, but the results showed less control (broader polydispersities >2, indicating a low rate of transfer between acrylate chains) (see: *Macromolecules*, 28, 8051–8056 (1995)). DIT processes with acrylates have been disclosed in a few documents; however, these aim at obtaining iodine-functional chains instead of aiming at actual living polymerizations (see for instance U.S. Pat. No. 6,143,848). DIT processes to prepare block copolymers of acrylates and styrene have been reported in EP 947527, *Macromolecules*, 28, 2093 (1995), and *Macromol. Rapid Commun.*, 2000, 21(13), 921.

A few attempts to obtain a degenerative iodine transfer process with meth-acrylates have been reported, but all of these suggest that methacrylate monomers cannot be used in an acceptable manner in conventional DIT processes using the conventional iodine-functional CTAs, which are applied in the DIT process for e.g. styrene (see for instance *Macromolecules*, 28, 8051 (1995)). High-molecular weight material is formed at the start of the polymerization, leading to high polydispersities, without the typical linear development of molecular weight with conversion, which is characteristic for a polymerization with a living character, being observed. Another comparison of DIT processes with styrene, acrylate, and methacrylate monomers was disclosed in B. Klumperman at the UNESCO School & South African IUPAC conference on Macromolecular and Materials Science, 29–31 Mar. 1999 and 10–12 Apr. 2000, which is to be found at http://www.sun.ac.za/unesco/PolymerED2000/Conf1999/Lectures1999/Klu mp2.pdf and www.sun.ac.za/unesco/PolymerED2000/Conf2000/KlumpermanC.pdf.

Here it is also concluded that DIT is not a suitable process for the polymerization of a mixture of monomers containing a substantial amount of methacrylate monomers. Therefore, it has been assumed in the art that DIT is not suitable for polymerizing methacrylates under controlled conditions. In U.S. Pat. No. 5,439,980 this is confirmed in Comparative example 2, where it was found that when methylmethacrylate alone is used with an iodide-functional perfluoropolyether, only a homopolymer of methylmethacrylate is produced and a block polymer with a perfluoropolyether is not produced.

Since methacrylates are a very important class of monomers for many applications, with high- and low-polarity candidates and various functional side groups available, with high-Tg backbones with good chemical durability being formed, the inability to use methacrylates is a serious problem in DIT technology, and a need exists for an effective DIT method allowing the production of polymers based on methacrylates with structures that benefit from the advantages of the living nature of the polymerization process.

It is an objective of the present invention to obtain a DIT process that can be used for polymerizing methacrylate monomers. This objective should be reached by a DIT process using methacrylates in a very favourable way, showing all characteristics of a living polymerization in the manner of obtaining a high transfer rate of iodine atoms between methacrylate chain ends, leading to better control than a DIT process using styrenic monomers, to low polydispersities closely resembling those of ATRP or RAFT processes, molecular weights (linearly) increasing with conversion, and the opportunity to prepare well defined block and gradient methacrylate-containing copolymers.

It has now been found that polymers obtained by polymerizing methacrylic monomers in the presence of iodine or iodine-containing chain transfer agents can be made in the above favourable manner if the polymerization is performed according to the method of the present invention. According to this invention, a method was developed for making a methacrylate unit-containing polymer with a polydispersity <1.7 and containing at least one cross-linkable functional group comprising a step of radically polymerizing a mixture of ethylenically unsaturated monomers comprising at least 50 mole % of methacrylate monomers to a polymer, in the presence of a) a radical precursor and b) $I_2$ or a sulfonyl iodide.

The term "methacrylate" monomer in this application stands for methacrylic acid, esters thereof, amides thereof, anhydrides thereof and/or methacrylonitrile monomers.

It should be noted that the polymerization reaction of methacrylate monomers in the presence of molecular iodine as such is disclosed in an article by A. A. Lissi and J. Aljaro in *Polymer Letters Edition*, Vol. 14, 499–502 (1976). In this reference it is disclosed that iodine is an efficient inhibitor of the radical polymerization reaction of vinyl acetate, allyl acetate, and methyl methacrylate. The reaction with methyl methacrylate was performed with the common radical precursor azobisisobutyronitrile (AIBN) to give a polymer of unknown polydispersity. Excessive amounts of radical precursor with respect to iodine were used. The polymer of Lissi et al. was made for theoretical reasons only and did not have a functional group for cross-linking. Further, no disclosure or suggestion was made to apply this method in DIT or living radical polymerization processes, and no practical application of this polymer was given.

The low polydispersity of the polymers of the invention is important for coating formulations with a good balance of pot life and curing speed, viscosity and network properties. Preferably the polydispersity is <1.6, more preferably <1.5, most preferably <1.35. The functional group for cross-linking, on the other hand, is essential when making polymeric networks if the polymer is applied in a cross-linking composition.

The radical polymerization is performed in the presence of iodine or a sulfonyl iodide. In the latter case, an aromatic sulfonyl iodide, more specifically p-toluenesulfonyl iodide, is preferred. Most preferred is the use of iodine.

The invention also pertains to the use of the iodine-functional methacrylate unit-containing polymers prepared according to the method of the invention to make a cross-linked network or to such use in a further polymerization process, preferably a DIT process proceeding with a high level of control.

To this end the invention also pertains to the above method for making a block or gradient methacrylate unit-containing copolymer with low polydispersity.

The polymer of the invention can also be a di- or multi-block or gradient copolymer either through the use of monomers with differing polymerization reactivities or by means of monomer feeding strategies, as is known to the person skilled in the art.

When molecular iodine is used, the iodine radical released after one iodine is abstracted by a polymer radical does not reinitiate a methacrylate polymerization, but recombines with another polymer radical. The net effect of molecular iodine is the functionalization of two polymer chains with an iodine end group, in an identical way (*J. Polym. Sci. Polym. Lett.* Ed. Vol. 14, 499–502 (1976)). In terms of the polymerization process, it implies that slightly more than 1 equivalent of initiating radicals should be generated, compared to the iodine atoms present in the systems as molecular iodine. Preferably, the amounts are selected so that the mole ratio $I_2$: radical precursor is between 0.05 n and 0.5 n, more preferably between 0.1 n and 0.5 n, and most preferably between 0.25 n and 0.5 n, wherein n stands for the number of radicals effectively generated per molecule of radical precursor. In the case of the use of a sulfonyl iodide chain transfer agent, the preferred mole ratio sulfonyl iodide: radical precursor is >0.1 n, preferably >0.5 n, wherein n has the same meaning.

The polymerization process of the invention takes places at temperatures of less than 130° C., preferably less than 110° C., even more preferably less than 90° C., and most preferably less than 70° C. It is preferred that as a radical precursor a precursor of mild initiating radicals is used. Mild initiating radicals are for example C-centered radicals, preferably C-centered radicals obtained from the decomposition of azo radical initiators. Initiators of the azo-type include azobisisobutyronitrile (AIBN) or azobisvaleronitrile.

It may be advantageous to modify the iodine end groups-containing polymers formed in the process according to the invention in a process after or during the polymerization. The end groups can be modified, e.g., by elimination, cyclization, atom transfer, redox, or substitution reaction, optionally under removal of iodine and/or low-molecular weight iodine-containing compounds. More specifically, the removal of the iodine atom can be done for example by a nucleophilic reaction or by heating of the polymer (leading to homolytic scission but also to elimination products), by reaction with a radical-generating compound. It may be favourable to perform such thermal or radical reactions in the presence of reducing conditions to scavenge iodine radicals or $I_2$ formed. If the modification reaction is performed under conditions where the polydispersity remains <1.7, the product so obtained can be used as described above.

The nucleophilic reaction can suitably be performed by using mercaptopropionic acid in combination with a base. The radical-generating compound may be a peroxide, for example $H_2O_2$. A radical reaction under reducing conditions can be performed by heating the iodine-functional polymers in the presence of sodium formaldehyde sulfoxylate.

The polymerization process can take place in batch mode or semi-batch mode, with feeding of several of the reactants to the vessel, or in a process comprising a continuous step. The polymerization can be carried out in bulk, in an organic solvent or in an aqueous medium, in a suspension polymerization process, an emulsion polymerization process, a dispersion polymerization process, or a mini-emulsion polymerization process.

Preferred methacrylate unit-containing polymers have an Mn of below 20,000, more preferably below 10,000 and more than 500, even more preferably below 5,000, most preferably below 3,500 and more than 1,000.

The polymers to be formed using the method according to the invention must contain methacrylate units; more specifically they contain at least 50 mole % of a methacrylate monomer. The other (co)monomers may be of the acrylate, styrene, vinyl ester, and maleate type. More preferred is a composition containing at least 70 mole % of methacrylate units, most preferred is a composition having at least 90 mole % of methacrylate units.

Suitable mixtures for making the methacrylate unit-containing polymer comprise monomers selected from acrylic acid, methacrylic acid, methyl acrylate, ethyl acrylate, butyl acrylate, methyl methacrylate, ethyl methacrylate, butyl methacrylate, glycidyl methacrylate, glycidyl acrylate, 2-hydroxyethyl acrylate, 2-ethylhexyl acrylate, potassium methacrylate, cyclohexyl methacrylate, 2-(dimethylamino)ethyl methacrylate, stearyl methacrylate, 2-hydroxyethyl methacrylate, 2-hydroxypropyl methacrylate, vinyl methacrylate, benzyl methacrylate, lauryl methacrylate, acrylamide, acrolein, methacrylamide, methacrolein, acrylonitrile, methacrylonitrile, styrene, methylstyrene, chlorostyrene, vinyl acetate, vinyl propionate, vinyl butyrate, vinyl valerate, vinyl chloride, vinyl trichlorosilane, vinyl trimethoxysilane, vinyl trimethylsilane, butadiene, isoprene, chloroprene, maleic acid, maleimide, methyl maleate, ethyl maleate, propyl maleate, butyl maleate, calcium maleate, allyl maleate, 2-ethylhexyl maleate, octyl maleate, maleic hydrazide, maleic anhydride, fumaric acid, methyl fumarate, ethyl fumarate, propyl fumarate, butyl fumarate, sodium fumarate, fumaronitrile, fumaryl chloride, vinyl acetate, tert-decanoic acid ethenyl ester (VeoVa® 10, ex Resolution Performance Products), neononanoic acid ethenyl ester (VeoVa® 9, ex Resolution Performance Products), vinyl pivalate, and the like.

In a further preferred embodiment the polymerization is performed in the presence of an epoxide-containing compound. In the presence of epoxide-containing compounds the polydispersity obtained is narrower. Such epoxide compounds are preferably selected from glycidyl ethers, glycidyl esters, and cycloaliphatic epoxides. Suitably glycidyl-containing monomers include glycidyl methacrylate, glycidyl acrylate, and the glycidyl ester of neodecanoic acid (Cardura® E10). The method according to the invention is preferably performed such that the mole ratio epoxide:iodine atom-containing polymer is at least 0.01, preferably at least 0.05.

To acquire a methacrylate unit-containing polymer with at least one cross-linkable functional group in the mixture of ethylenically unsaturated monomers, ethylenically unsaturated compounds containing at least one group for cross-linking with a co-reactive compound or for cross-linking with another functional group are present. Such a group for cross-linking may be any group known to the skilled person for making a polymeric network such as an acid group, oxirane group, hydroxy group, acetoacetoxy group, amino group, ketone group, aldehyde group, isocyanate group (including derivatives thereof like urethdiones and cyanurates), thiol group, alkoxysilane group, carbamate group, activated unsaturated group such as a (meth)acryloyl group, cyclic carbamate group, or oxazoline group. The use of the above functional groups in polymeric networking is for example described in H. Stolzenbach, "Cross-linking of binding agents for paints," *Advances in Organics Coatings Science and Technology Series* (1989), 11, 246–259 and M. Ooka, "Recent developments in cross-linking technology for coating resins," *DIC Tech. Rev.*, (1995), No. 1, 1–8, incorporated herein by reference. The polymeric network can be formed by any conventional reaction suitable for forming a network, such as a polyaddition reaction or a polycondensation reaction. The polymeric network may also be formed by a combination of (different) reactions between the cross-linkable functional groups and/or the co-reactive groups present in the film-forming composition.

It is understood that the monomer mixture need only comprise a small amount of monomers with a cross-linkable functional group to acquire a methacrylate unit-containing polymer with at least one cross-linkable functional group. In general, the monomer mixture comprises 1 to 100 mole %, preferably at least 5 mole %, more preferably at least 10 mole % of monomers with a cross-linkable functional group. The cross-linkable functional group may be present on a methacrylate monomer or a non-methacrylate monomer or on both. It is also possible to use more than one type of monomer with the same or different functional groups.

Examples of monomers with carboxylic acid functionality are acrylic and methacrylic acid. Optionally, the acid groups may be latent as, for example, in maleic anhydride, where the acid functionality is present in the form of an anhydride group. Other possible carboxylic acid-functional monomers are oligomerized acrylic acids such as $\beta$-carboxyethyl acrylate or its higher analogues (commercially available from Rhodia as Sipomer® B-CEA), itaconic acid, fumaric acid, maleic acid, citraconic acid, or the anhydrides thereof. Also adducts of a hydroxy-functional monomer with an acid anhydride can be used, for example the adduct of hydroxyethyl methacrylate with hexahydrophthalic anhydride.

Examples of monomers comprising an amine functionality are dimethyl-aminoethyl (meth)acrylate and tertiary-butyl aminoethyl (meth)acrylate. Amine functionality can also be introduced into the polymer by post reaction of the carboxylic acid group derived from the copolymerization of a functional monomer such as acrylic or methacrylic acid with ethylene imine or propylene imine. Also acetoacetoxy groups from the copolymerization of for instance acetoacetoxy ethylmethacrylate can be reacted with poly(ethylene imine) to obtain amine functionality. A class of primary amine functional monomers was described recently (GEURTS et al., *J. Appl. Polym. Sci.* 2001, Vol. 80 No. 9, 1401–15.) and includes aminoethyl, 3-amino-1-propyl, 5-amino-1-pentyl, 6-amino-1-hexyl and 11-amino-1-undecyl methacrylate. Optionally, these monomers may be used as their salts, for example with HCl.

Examples of monomers with oxirane functionality are glycidyl acrylate and glycidyl methacrylate.

Examples of hydroxy-functional monomers for cross-linking are acrylate esters having a hydroxy group such as hydroxyethyl methacrylate, hydroxyethyl acrylate, hydroxypropyl acrylate, hydroxypropyl methacrylate, hydroxybutyl acrylate, and the like.

Also adducts of hydroxy-functional monomers with ethylene or propylene oxide can be present in the monomer composition.

Also monomers having latent hydroxy groups, such as glycidyl (meth)-acrylate, can be used.

Another suitable class of functional monomers for crosslinking is ketone-functional monomers, such as the acetoacetoxy esters of hydroxyalkyl acrylates and methacrylates, such as acetoacetoxyethyl (meth)acrylate, and keto-comprising amides such as diacetone acrylamide.

Examples of isocyanate-functional monomers are: benzene, 1-(1-isocyanato-1-methylethyl)-3-(1-methylethenyl) (m-TMI from Cytec) and 2-isocyanatoethyl methacrylate (Karenz MOI® from SHOWA DENKO). Also, an adduct made from hydroxy-functional monomer and a di- or triisocyanate can be used, for example the adduct of hydroxyethyl methacrylate with isophorone diisocyanate.

An example of an oxazoline-functional monomer is 2-isopropenyl-2-oxazoline.

The choice of the co-reactive compound that is added to the polymer and can react with the functional group of the polymer depends on the chemical nature of this functional group. This co-reactive compound may be either a polymeric or a low-molecular weight compound. In order to effect cross-linking, the co-reactive compound must possess at least two co-reactive groups.

Examples of suitable co-reactive groups for given pendant functional groups are known to the skilled person. Non-limiting examples are given in Table I.

TABLE I

| Pendant functional group | Co-reactive groups |
| --- | --- |
| Carboxylic acid (anhydride) | Oxirane, carbodiimide, aziridine, azetidine, oxazoline, hydroxyl, amino, carboxylic acid |
| Oxirane/epoxy | Carboxylic acid (anhydride), amino, thiol, hydroxyl, oxirane |
| Hydroxy | Methylol, etherified methylol, isocyanate, aldehyde |
| Acetoacetoxy | Amino, aldehyde, isocyanate, methylol |
| Amino | Acetoacetoxy, oxirane, aldehyde, ketone, isocyanate, carbamate |
| Ketone | Amino, hydrazide |
| Aldehyde | Amino, hydrazide |
| Isocyanate | Hydroxy, amino, thiol |
| Thiol | isocyanate, thiol, oxirane |
| alkoxysilane | carboxylic acid (anhydride), hydroxyl, water |
| carbamate | amino, etherified methylol |
| activated unsaturated groups (e.g. (meth)acryloyl) | acetoacetate, malonate, thiol, amino |
| cyclic carbamate | amino, carboxylic acid (anhydride), hydroxyl |
| Oxazoline | Carboxylic acid (anhydride) |

It is understood that the functional groups can be present as such or can be blocked by groups known to the person skilled in the art. In this respect, isocyanate groups can be blocked by for example a ketoxime (such as methyl ethyl ketoxime) or a pyrazole blocking group (for further blocking isocyanates see *Prog. Org. Coat*, 36 (1999), 148–172), epoxy groups can be blocked by a carbon dioxide blocking group, acetoacetate groups can be blocked under formation of enamines, carbonyl groups and hydroxyl groups can be blocked under formation of acetals or ketals, hydroxyl groups can further be blocked under formation of oxazolidines, silyl ethers, and N-vinylcarbamates, carboxylic acids under formation of esters, amides or anhydrides, and amino groups under formation of ketimines, aldimines or oxazolidines.

The polymers of the invention can be used in a cross-linkable composition for making a polymeric network, either through self-condensation of the functional groups, or through reaction with an additional co-reactive compound as explained above. Preferably they are used in a film-forming composition such as a coating composition, adhesive or printing ink. Most preferred is application in automotive OEM and repair coatings and in general industrial coatings.

The invention is further illustrated with the following examples.

All reported molecular weights were determined by size exclusion chromatography (RI detection) and are expressed in polystyrene equivalent molecular weights, unless specified otherwise. The polydispersity of the resin is determined as the ratio Mw/Mn. Low-molecular weight materials (M<500), originating e.g. also from initiator in cage recombination products and optionally added low-molecular weight epoxides, were not taken into account for this determination of the main polymer envelope in the molecular mass distribution. The following abbreviations are used: MMA= methyl methacrylate, BMA=n-butyl methacrylate, GMA=glycidyl methacrylate; BA=butyl acrylate, SEC=size exclusion chromatography, Mn=number average molecular weight, Mw=weight average molecular weight, Mz=Z-average molecular weight.

EXAMPLE 1

A reaction vessel was charged with 11.01 g of MMA, 11.00 g of BMA, 8.06 g of HEMA, 20 g of BA, 1.523 g of 12, and 2.26 g of 2,2'-azobis(2,4-dimethyl-valeronitrile), degassed, and maintained under a nitrogen atmosphere. The temperature was raised to 64° C., and the reaction was continued for 7 h. SEC analysis of a sample taken after this period (conversion 98%) yields an Mn of 4,800, an Mw/Mn of 1.26, and an Mz/Mw of 1.31.

EXAMPLE 2

To a reaction vessel maintained at 65° C. a solution consisting of 36.49 g of BMA, 6.57 g of GMA, 3.69 g of 12, and 5.42 g of 2,2'-azobis(2,4-dimethyl-valeronitrile) and 16 g of Dowanol® PM (glycol ether solvent ex Dow Chemicals Co) was fed over a period of 2 h to obtain a first BMA-co-GMA block of Mn 2,880, Mw/Mn 1.25, Mz/Mw 1.19.

EXAMPLE 3

A reaction vessel was charged with 11.02 g of MMA, 11.01 g of BMA, 20.06 g of BA, 1.52 g of 12, and 2.26 g of 2,2'-azobis(2,4-dimethylvaleronitrile), degassed, and maintained under a nitrogen atmosphere. The temperature was raised to 64° C., and the reaction was monitored until the dark iodine colour started to fade (conversion 9%). At this point, 5.29 g of methacrylic acid and 2.75 g of Cardura® E-10 (epoxide ex Resolution Performance Products) were added in one shot and the reaction was continued for 4 h. SEC analysis of a sample taken after this period (conversion 99%) yields an Mn 2,928, an Mw/Mn of 1.32, and an Mz/Mw of 1.28.

The invention claimed is:

1. A method for making a methacrylate unit-containing polymer with a polydispersity less than 1.7 and comprising at least one cross-linkable functional group, the method comprising a step of radically polymerizing a mixture of ethylenically unsaturated monomers comprising at least 50 mole % of methacrylate monomers to a polymer in the presence of a) a radical precursor and b) $I_2$ or a sulfonyl iodide.

2. The method according to claim 1 wherein the sulfonyl iodide is an aromatic sulfonyl iodide.

3. The method according to claim 2 wherein the aromatic sulfonyl sulfonyl iodide is p-toluenesulfonyl iodide.

4. The method according to claim 1 wherein the temperature during the polymerization step is lower than about 130° C.

5. The method according to claim 1 wherein the temperature during the polymerization step is lower than about 110° C.

6. The method according to claim 1 wherein the temperature during the polymerization step is lower than about 90° C.

7. The method according to claim 1 wherein the temperature during the polymerization step is lower than about 70° C.

8. The method according to claim 1 wherein the mole ratio of the sulfonyl iodide to the radical precursor is greater than 0.1n, or wherein the mole ratio of the $I_2$ to the radical precursor is between 0.05n and 0.5n, wherein n stands for the number of radicals effectively generated per molecule of radical precursor.

9. The method according to claim 1 wherein the polymerization is performed in the presence of an epoxide-containing compound.

10. The method according to claim 9 wherein the mole ratio of the epoxide to the iodine atom is at least 0.01.

11. The method according to claim 10 wherein the mole ratio of the epoxide to the iodine atom is at least 0.05.

12. A block or gradient copolymer comprising the polymer obtained according to claim 1.

13. The method according to claim 1 further comprising a second step wherein the iodine atom is removed from the polymer.

14. The method according to claim 13 wherein the iodine atom is removed by nucleophilic reaction, by heating, or by reaction with a radical generating compound, optionally under reducing conditions.

15. A cross-linkable composition for making a polymeric network comprising the polymer obtained according to claim 1.

16. The cross-linkable composition of claim 15 wherein the composition is a coating composition, an adhesive, an ink formulation, an automotive OEM or repair coating, or an industrial coating composition.

* * * * *